United States Patent [19]

Smith et al.

[11] 4,057,893
[45] Nov. 15, 1977

[54] MILLING TABLE LATHE

[75] Inventors: Joe Delano Smith; David Daniel McCall; James Alexander Kyzer, all of Orangeburg, S.C.

[73] Assignee: Still-Walter Tool & Manufacturing Company, Orangeburg, S.C.

[21] Appl. No.: 674,638

[22] Filed: Apr. 7, 1976

[51] Int. Cl.² .................. B23P 23/02; B23Q 37/00
[52] U.S. Cl. ............................ 29/560; 29/27 C; 82/2 B; 90/13 C; 90/20; 90/DIG. 1; 144/46
[58] Field of Search .................. 90/20, 11 R, DIG. 1, 90/13 C; 82/2 B; 29/27 A, 27 C, 560; 144/46; 408/23

[56] References Cited

U.S. PATENT DOCUMENTS

| 2,094,484 | 9/1937 | Bennett | 90/20 X |
|---|---|---|---|
| 2,497,023 | 2/1950 | Austin | 90/11 R |
| 2,832,023 | 4/1958 | Gough | 90/13 C |

Primary Examiner—Z. R. Bilinsky
Attorney, Agent, or Firm—B. P. Fishburne, Jr.

[57] ABSTRACT

A lathe head (work rotating device) and lathe tail stock (when required) are mounted on the table of a conventional numeric control milling machine. A tool holder and support are secured fixedly to a part of the stationary bed of the milling machine. The part to be machined is clamped in the lathe chuck and rotated by the lathe head. The mill table is programmed to move the work piece relative to the stationary tool in the required directions for machining.

7 Claims, 3 Drawing Figures

MILLING TABLE LATHE

BACKGROUND OF THE INVENTION

Numeric control milling machines and engine lathes are both well known devices in the machine tool art. A typical numeric control milling machine may cost $45,000 and up and a numeric control lathe may cost $35,000 and up.

The objective of this invention is to impart numeric control lathe capability to an otherwise conventional milling machine with only relatively slight increase in cost for the added components, which cost increase may be approximately one-tenth of the cost of a separate numeric control lathe.

According to the invention, the above objective is obtained by mounting a lathe head and chuck of a conventional manually controlled engine lathe and the coacting lathe tail stock on the translational table of a numeric control milling machine. In so doing, the structure of the milling machine is not altered, reformed or defaced in any way and the mill retains its full original capability as a separate machine tool.

Additionally, a lathe turning tool and its holder are securely mounted in fixed relation to the mill table and the rotating work by clamping to the stationary bed structure of the milling machine, whereby in the subsequent turning or machining of the work piece, the latter is moved with the mill table relative to the stationary tool rather than vice-versa as is customary in all engine lathes, whether manual or numeric control types.

In a sense, therefore, the invention comprises a comparatively simple and inexpensive lathe attachment means or "kit" for a costly numeric control milling machine. In a broader sense, the invention comprises an improved numeric control mill which has the capabilities of a numeric control engine lathe without the necessity for a user or a manufacturer to possess both costly machines. Instead, by means of the invention, the possessor of a numeric control mill may acquire the lathe capability by an expenditure of about one-tenth the cost of acquiring a numeric control engine lathe.

Various features and advantages of the invention will appear to those skilled in the art in the course of the following description.

BRIEF DESCRIPTION OF DRAWING FIGURES

DETAILED DESCRIPTION

Figure 3:
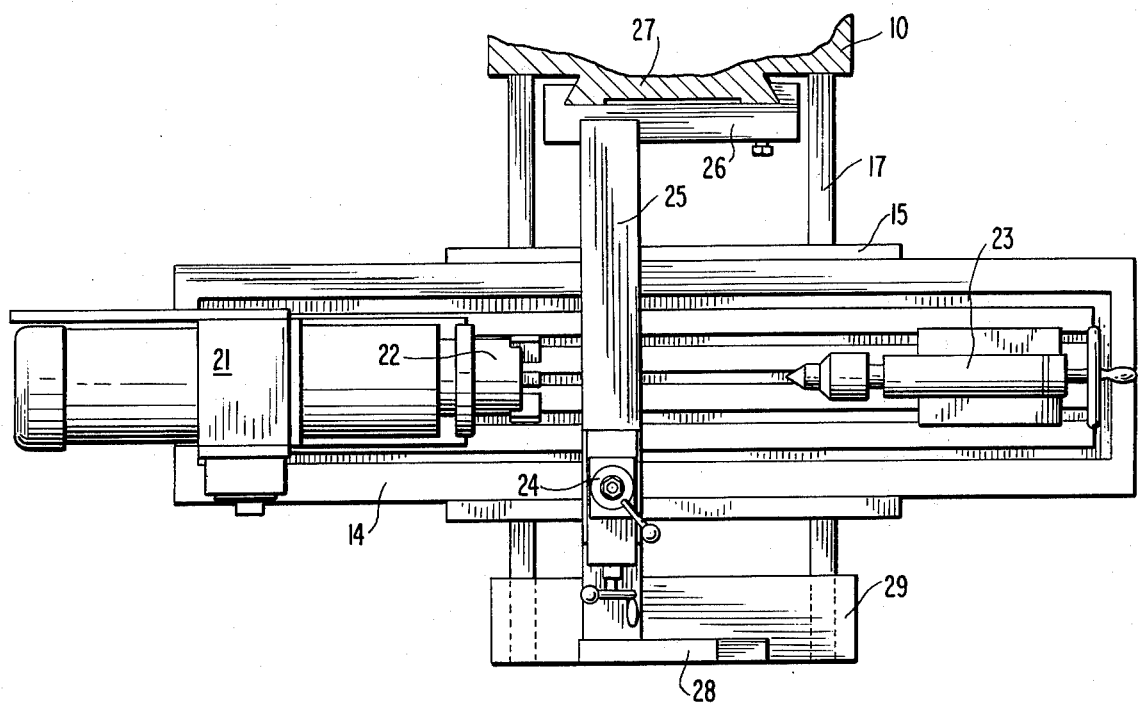
FIG. 3 is a plan view showing the milling table and lathe components.

Referring to the drawings in detail wherein like numerals designate like parts, a conventional numeric control milling machine has a stationary floor mounted base or bed 10 from the back of which rises a pedestal body 11 carrying at its top a milling head 12 including a vertical axis rotary milling cutter 13 which overlies the customary work piece supporting translational table 14. The mill table 14 is held in a first guide or way 15 for translation in one linear path relative thereto by conventional driving means 16. The table and the first way 15 are mounted on a second right angular guide or way 17, FIG. 3, for movement along a second linear path perpendicular to the first path and in the plane thereof under control of a second conventional driving means 18. The above construction and mode of operation is quite conventional and well-known to those skilled in the art and, for purposes of this invention, a more detailed description of the basic milling machine is unnecessary.

The translational movement of the milling machine table 14 on its two liner paths is under control of a conventional numeric control means or unit 19 which may be remote from the mill and linked thereto by a suitable control cable 20. By this known means, the required movements of the table 14 can be preprogrammed in the control unit 19 and are carried out completely automatically during the milling of a work piece suitably secured to the table 14. Additionally, in the conventional mill, the cutter 13 has the ability to move vertically or on a third coordinate axis in relation to the table 14, when required.

In accordance with the present invention, the described milling machine and its numeric control means is utilized without physical alteration, defacing or redesign. It contains its full operational capability as a mill at all times. The invention involves merely the addition of lathe components to the milling machine which enable it to obtain numeric control lathe capability at minimal additional cost compared to the cost of a separate and independent numeric control engine lathe.

More particularly the invention comprises fixedly mounting on the mill table 14 near one end thereof the head 21 or work piece rotating means of a conventional manually controlled engine lathe. The lathe head 21 is removably attached to the table 14 so that the machine can easily be reconverted to straight milling operations when desired. The lathe head 21 includes the usual horizontal axis rotating chuck 22 with work clamping jaws. A conventional lathe tail stock 23 is separately mounted removably on the mill table 14 near the other end thereof for supporting long work pieces while they are being turned, as required. Shorter work pieces may be held solely by the chuck 22 without the tail stock 23, as is well known.

Figure 1:
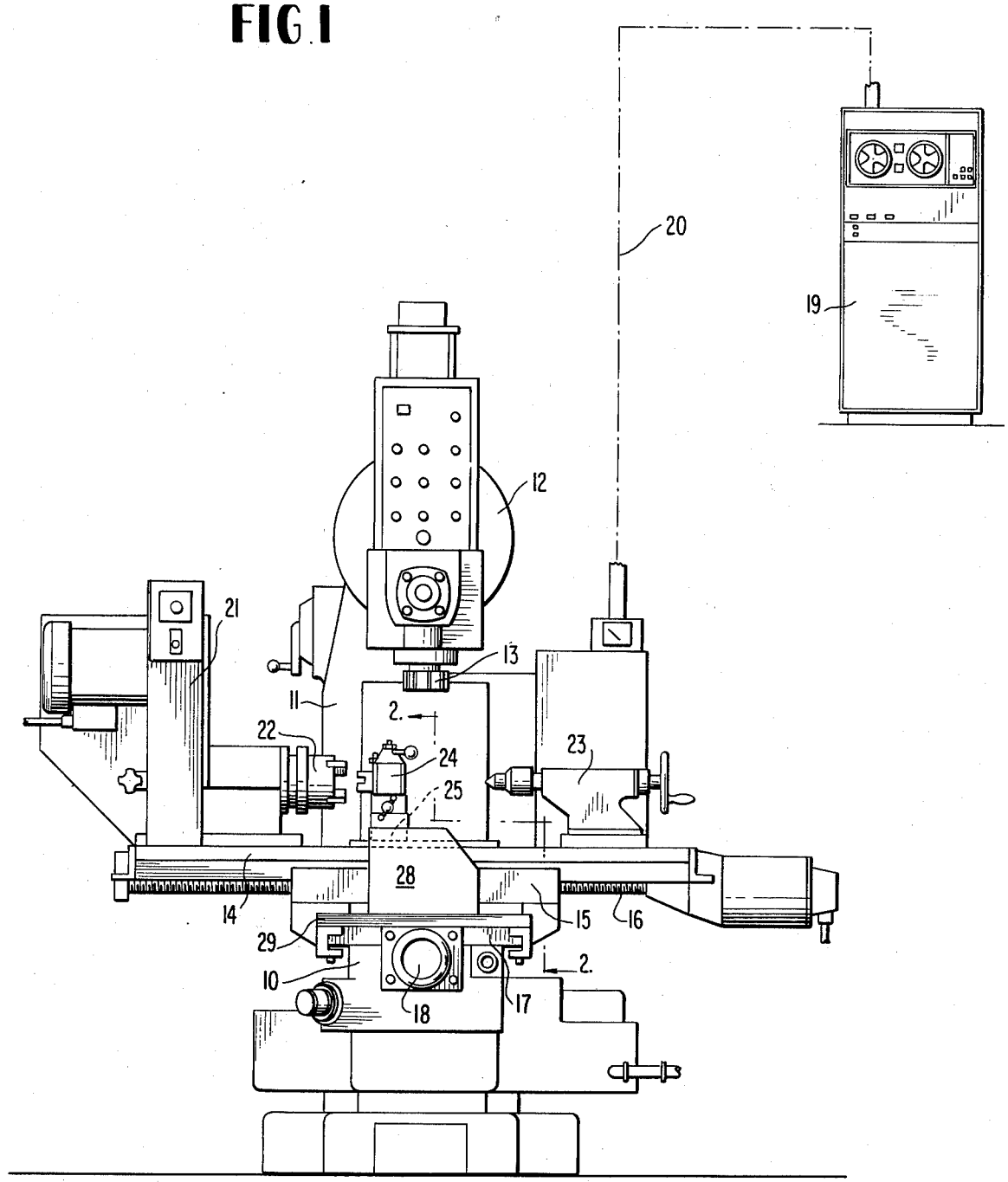
FIG. 1 is a front elevational view of a numeric control milling machine equipped with lathe components in accordance with the invention.
Figure 2:
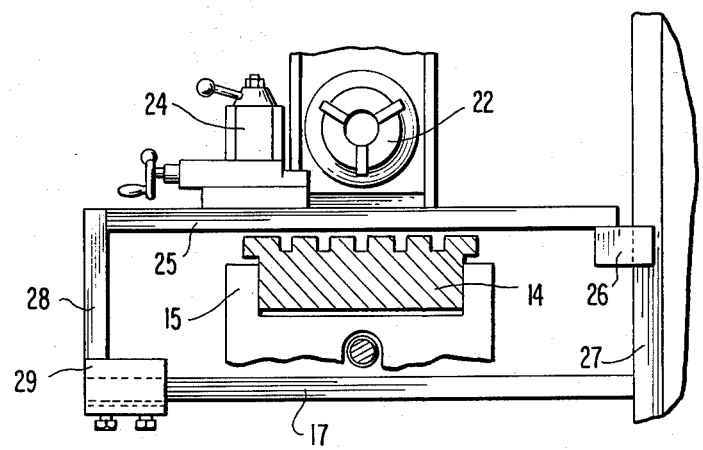
FIG. 2 is an enlarged fragmentary cross section taken on line 2—2 of FIG. 1.

A key feature of the invention lies in the provision of a lathe tool holder 24, or in some cases several tool holders, secured to a rigid support beam 25 which extends transversely across the table 14, FIG. 2, and has its rearward end releasably secured through a clamping member 26 to a component 27 which is a part of the stationary milling machine base or bed 10. The forward end of the support beam 25 is rigidly attached to a post extension 28 which carries a clamping head 29 at its lower end which is rigidly and detachably secured to the forward end of the way 17 which is an integral part of the milling machine stationary bed or base.

In this manner, the lathe tool holder means 24 is securely mounted in fixed relation to the table 14 of the milling machine which can translate on two coordinate axes under control of the programmable numeric control unit 19. The work rotating and support lathe means 22 and 23, being bodily mounted on the table 14, allows the rotating work piece to be moved relative to the stationary lathe tool rather than having the tool move into the rotating work, as with conventional lathes. With the described arrangement, full advantage can be taken of the programmable control means 19 for table 14 during intricate lathe operations, just as the same control means is used in connection with milling operations on the same basic machine, all at a great economic savings, as explained previously. The lathe attachment components 21, 23, 24 and 25 are easily removable from the milling machine so that the latter may be operated in the customary manner.

The invention is chacterized by simplicity of construction, versatility and economy. It fulfills a definite need by certain manufacturers and machine shops for a numeric control lathe or the capabilities of such a machine tool where is is not feasible economically to acquire such a separate expensive device. The advantages of the invention should now be readily apparent to those skilled in the art without the necessity for a more detailed description of elements which per se are conventional, but which are utilized in the invention in a unique combination, rendering it possible to obtain results heretofore obtainable only by employing two separate costly machines.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A milling table lathe comprising in combination a numerically controlled milling machine including a stationary machine bed and a numerically controlled translational milling table mounted on said bed lathe head attachment for said milling table removably mounted thereon said attachment including workpiece holding and rotating means, a fixed cutting tool holder support unit carrying a holder with a cutting tool thereon for turning a workpiece in said holding and rotating means during numeric control translation of the rotating workpiece relative to said cutting tool holder support unit while mounted on said table, said support unit including a support member for said tool holder spanning said milling table and spaced therefrom and being fixedly secured to said stationary machine bed on which said milling table is translationally mounted.

2. A milling table lathe as defined in claim 1, and a tail stock for the rotating workpiece in said lathe head removably mounted on said milling table.

3. A milling table lathe as defined in claim 1, said machine bed including an upright portion and a horizontal portion and said support member including a beam positioned above and across the milling table said beam including a forward end and a rear end and having its rear end secured to the upright part of said machine bed rearwardly of the milling table, the forward end of said beam being rigidly supported on a horizontal part of said machine bed forwardly of the milling table.

4. A milling table lathe as defined in claim 3, and a support post secured dependingly to the forward end of said beam, and a clamp head carried by a lower end of the post and adapted to clampingly engage said horizontal part of the machine bed.

5. A milling table lathe as defined in claim 4, and a clamp head carried by the rear end of said beam and adapted to clampingly engage the vertical part of said machine bed.

6. A milling table lathe as defined in claim 1, and the rotational axis of said lathe head workpiece holding and rotating means being parallel to and above the plane of said milling table.

7. A milling table lathe as defined in claim 1, and an adjustable tool holder rest on said support unit allowing a work turning tool to be shifted toward and away from a rotating workpiece in said workpiece holding and rotating means.

* * * * *

UNITED STATES PATENT OFFICE
CERTIFICATE OF CORRECTION

Patent No. 4,057,893                   Dated   Nov. 15, 1977

Inventor(s)   Joe Delano Smith et al.

It is certified that error appears in the above-identified patent and that said Letters Patent are hereby corrected as shown below:

Claim 1, line 4, before "lathe" insert -, a-.

Signed and Sealed this

Fourteenth Day of February 1978

[SEAL]

Attest:

RUTH C. MASON  
Attesting Officer

LUTRELLE F. PARKER  
Acting Commissioner of Patents and Trademarks